United States Patent [19]
Maeda et al.

[11] 3,897,544

[45] July 29, 1975

[54] METHOD FOR PRODUCING ANHYDROUS SODIUM DITHIONITE

[75] Inventors: Shohe Maeda, Ashiya-shi; Masayuki Yasue, Nara-shi; Mitsuo Aruga, Ichihara-shi; Sizuo Saito, Toyonaka-shi; Ikuo Yasunaga, Minoo-shi, all of Japan

[73] Assignee: Sumitomo Chemical Co., Ltd., Osaka, Japan

[22] Filed: Jan. 2, 1970

[21] Appl. No.: 451

[30] Foreign Application Priority Data
Jan. 10, 1969 Japan................................ 44-2244

[52] U.S. Cl. ............................................... 423/515
[51] Int. Cl............................................. C01b 17/66
[58] Field of Search ............................. 23/114–116

[56] References Cited
UNITED STATES PATENTS
3,411,875  11/1968  Yoshikawa et al. .................. 23/116

FOREIGN PATENTS OR APPLICATIONS
1,148,248  4/1969  United Kingdom................... 23/116

*Primary Examiner*—Earl C. Thomas
*Attorney, Agent, or Firm*—Stevens, Davis, Miller & Mosher

[57] ABSTRACT

Production of highly pure anhydrous sodium dithionite in a high yield by reaction of sodium formate or a mixture of sodium formate and a sodium compound with sulfurous anhydride can be attained by using an aqueous solution of methanol as a reaction medium, whose temperature is elevated to cause reflux, and feeding sulfurous anhydride into the reflux liquid, whereby sulfurous anhydride being introduced into the reaction mixture.

13 Claims, No Drawings

METHOD FOR PRODUCING ANHYDROUS SODIUM DITHIONITE

This invention relates to a method for producing anhydrous sodium dithionite and more particularly it concerns an improved method for production on anhydrous sodium dithionite by the reaction of sodium formate or a mixture of sodium formate and a sodium compound with sulfurous anhydride.

Anhydrous sodium dithionite has been widely used industrially in the name of sodium hydrosulfite as a reducing agent.

As a method for the production thereof, it is known by various literatures that sodium formate or sodium formate and a sodium compound is reacted with sulfurous anhydride using aqueous solution of an alcohol as a reaction medium to directly produce anhydrous sodium dithionite. Regarding such method, Russian Pat. No. 52,052 and Japanese Patent Publication No. 7003/68 have provided a method according to which sulfurous anhydride is once dissolved in an alcohol to use as an $SO_2$-alcohol solution since direct introduction of sulfurous anhydride into reaction system causes decomposition of anhydrous sodium dithionite produced to reduce yield and purity.

However, even such method can only result in a low yield of anhydrous sodium dithionite to sulfurous anhydride such as 57–66 % as is clear from Examples mentioned in Japanese Patent Publicatioin No. 7003/68. Furthermore, when $SO_2$ concentration in the $SO_2$-alcohol solution introduced into the reaction system is increased, undesirable results are obtained as in the case of the direct introduction of sulfurous anhydride into the reaction system and therefore the $SO_2$ concentration should be as high as 13–16 % and cannot be increased thereabove. Thus, it is difficult to increase the yield per unit volume of the reaction system due to the reduction of the amount of alcohol introduced accompanying with sulfurous anhydride.

It is an object of this invention to provide a method for producing highly pure anhydrous sodium dithionite in a high yield to sulfurous anhydride and also in a high yield per unit volume of reaction system by the reaction of sodium formate or a mixture of sodium formate and a sodium compound with sulfurous anhydride.

This invention provides a method for producing anhydrous sodium dithionite which comprises dissolving or suspending sodium formate or a mixture of sodium formate and a sodium compound in an aqueous solution of methanol, heating the reaction mixture to cause reflux and feeding sulfurous anhydride into the reflux liquid, whereby sulfurous anhydride is introduced into the reaction mixture.

According to this invention, the amount of sulfurous anhydride introduced can be increased by feeding sulfurous anhydride into the reflux liquid regardless of the amount of reaction medium as in case of the direct introduction of sulfurous anhydride, thereby to make it possible to increase yield per unit volume of reaction system and the produce anhydrous sodium dithionite in a high purity and in a high yield to sulfurous anhydride without undesirable results as caused in case of the direct introduction of sulfurous anhydride.

The method of this invention will be explained in more detail below.

The reaction in the method of this invention is considered to proceed in accordance with the following reaction formula.

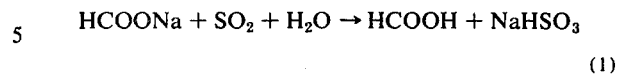

$$HCOONa + SO_2 + H_2O \rightarrow HCOOH + NaHSO_3 \quad (1)$$

When sodium hydroxide is used as a sodium compound, the following formulas will be resulted.

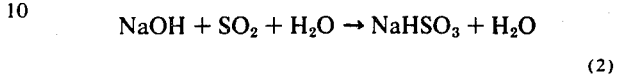

$$NaOH + SO_2 + H_2O \rightarrow NaHSO_3 + H_2O \quad (2)$$
$$2NaHSO_3 + HCOOH \rightarrow Na_2S_2O_4 + CO_2 + 2H_2O \quad (3)$$

Therefore, any sodium compounds capable of reacting with sulfurous anhydride and/or water to produce sodium bisulfite may be used as the sodium compound in this invention. For example, sodium hydroxide, sodium carbonate, sodium bicarbonate, sodium sulfite, sodium bisulfite, sodium metabisulfite and mixtures thereof may be used. Presuming that the sodium compound is totally converted into sodium bisulfite by the reaction with sulfuous anhydride and/or water, the sodium compound may be charged in any amount provided that the mole number of sodium bisulfite produced in the reaction is smaller than the mole number of sodium formate charged, and so no sodium compound may be used in some cases. Suitable concentration of methanol in the aqueous solution thereof is 60 to 90 %, preferably 70 to 80 %. When sodium formate or sodium formate and sodium compound are added to the aqueous solution of methanol and the temperature thereof is elevated while stirring, reflux starts at a temperature of 68°to 74°C. The reflux liquid is methanol containing a little amount of water. When sulfurous anhydride is added to said reflux liquid while cooling, the sulfurous anhydride is easily dissolved in the reflux liquid to enter the reaction system. Said sulfurous anhydride may be used in a liquid form or a gaseous form. Furthermore, it may be introduced as an $SO_2$ containing gas or an $SO_2$-methanol solution. The amount of sulfurous anhydride introduced should not exceed the calculation amount required for once converting the total sodium matter in sodium formate or sodium formate and a sodium compound into sodium bisulfite. Preferably, 50 to 90 % of said calculation amount is suitable. During introduction of sulfurous anhydride, the pH should be maintained at higher than 4.0 to prevent decomposition of sodium dithionite produced. Therefore, it is possible that the total of sodium compound is not added initially, but is dropped as an aqueous solution or an aqueous methanol solution in which a part or total amount of the compound is dissolved, with the introduction of sulfurous anhydride. As mentioned above, sulfurous anhydride is introduced in 2 to 5 hours and thereafter the reaction is further continued for 5 hours under reflux. Thereafter, the reaction product is subjected to filtration and drying to obtain crystalline highly pure anhydrous sodium dithionite in a high yield.

The following examples illustrate the present invention, however they are not intended to limit the scope of the invention. Parts and percents are by weight.

EXAMPLE 1

100 parts of sodium formate and 28 parts of sodium hydroxide were suspended in 600 parts of 75 % aqueous methanol solution and the temperature was elevated to cause reflux at 72°C. 110 parts of sulfurous anhydride was fed into the reflux liquid during 2 hours to introduce it into the reaction mixture. The reaction mixture was further stirred for additional 5 hours under reflux and thereafter filtration, washing with methanol and drying were effected to obtain 112 parts of anhydrous sodium dithionite having purity of 91 %. The yield to sulfurous anhydride was 75 %. $SO_2$ concentration was 19.6 % if all of sulfurous anhydride charged was dissolved in methanol and introduced as an $SO_2$-methanol solution.

EXAMPLE 2

117 parts of sodium formate and 32 parts of sodium hydroxide were suspended in 500 parts of 75 % aqueous methanol solution and the temperature was elevated to cause reflux at 74°C. 128 parts of sulfurous anhydride was fed into the reflux liquid during 3 hours to introduce it into the reaction mixture. The reaction mixture was stirred for additional 5 hours and thereafter filtration, washing with methanol and drying were carried out to obtain 131 parts of anhydrous sodium dithionite having a purity of 90 %. The yield to sulfurous anhydride was 75.2 %. If all of sulfurous anhydride was introduced as a methanol solution, $SO_2$ concentration was 25.2 %.

EXAMPLE 3

78 parts of sodium formate and 28 parts of sodium carbonate were suspended in 600 parts of 80 % aqueous methanol solution and the temperature was elevated to cause reflux at 71°C. 85 parts of sulfurous anhydride was fed into the reflux liquid during 2 hours to introduce it into the reaction mixture. The reaction mixture was stirred for additional 5 hours under reflux, and then filtration, washing with methanol and drying were effected to obtain 87 parts of anhydrous sodium dithionite having a purity of 86 %. The yield to sulfurous anhydride was 75 %.

EXAMPLE 4

131 parts of sodium formate was suspended in 600 parts of 80 % aqueous methanol solution and the temperature was elevated to cause reflux. 85 parts of sulfurous anhydride was fed into the reflux liquid during 3 hours. The reaction mixture was stirred for additional 5 hours under reflux and then filtration, washing with methanol and drying were effected to obtain 80 parts of anhydrous sodium dithionite having a purity of 91 %. The yield to sulfurous anhydride was 69 %.

EXAMPLE 5

100 parts of sodium formate was suspended in 488 parts of 75 % aqueous methanol solution and the temperature was elevated to cause reflux. 110 parts of sulfurous anhydride was fed into the reflux liquid while a solution obtained by dissolving 28 parts of sodium hydroxide in 112 parts of 75 % aqueous methanol solution was dropped to the reaction mixture. Said sulfurous anhydride and sodium hydroxide were supplied in 4 hours. The reaction mixture was stirred for additional 3 hours under reflux and then filtration, washing with methanol and drying were effected to obtain 110 parts of anhydrous sodium dithionite having a purity of 89 %. The yield to sulfurous anhydride was 74 %.

What is claimed is:

1. A method for producing anhydrous sodium dithionite, which comprises dissolving or suspending sodium formate or a mixture of sodium formate and a sodium compound in an aqueous solution of methanol, heating the reaction mixture to cause reflux, and feeding sulfurous anhydride into the reflux liquid whereby sulfurous anhydride being introduced into the reaction mixture wherein sulfurous anhydride is introduced as liquid $SO_2$, gaseous $SO_2$ or an $SO_2$-containing gas.

2. A method according to claim 1, wherein the methanol concentration in the aqueous solution is 60 to 90 %.

3. A method according to claim 1, wherein during introduction of sulfurous anhydride, the pH is maintained at higher than 4.0.

4. A method according to claim 1, wherein sulfurous anhydride is introduced in 2 to 5 hours.

5. A method according to claim 1, wherein the sodium compound is sodium hydroxide, sodium carbonate, sodium bicarbonate, sodium sulfite, sodium bisulfite, sodium metabisulfite or a mixture thereof.

6. A method according to claim 1, wherein an amount of sulfurous anhydride is 50 to 90 % by weight of the calculation amount required for converting sodium formate or sodium formate and a sodium compound into sodium bisulfite.

7. In a method for producing anhydrous sodium dithionite from sodium formate and sulfurous anhydride or from sodium formate, sulfurous anhydride and a sodium compound capable of producing sodium bisulfite by reaction with sulfurous anhydride and/or water, an improvement in which an aqueous solution of methanol is used as a reaction medium, whose temperature is elevated to reflux and sulfurous anhydride is introduced by dissolving or suspending it in the reflux liquid wherein sulfurous anhydride is introduced as liquid $SO_2$, gaseous $SO_2$ or an $SO_2$-containing gas.

8. A method according to claim 7, wherein the methanol concentration in the aqueous solution is 60 to 90 %.

9. A method according to claim 7, wherein during introduction of sulfurous anhydride, the pH is maintained at higher than 4.0.

10. A method according to claim 7, wherein sulfurous anhydride is introduced in 2 to 5 hours.

11. A method according to claim 7, wherein an amount of sulfurous anhydride is 50 to 90 % by weight of the calculation amount required for converting sodium formate or a mixture of sodium formate and a sodium compound into sodium bisulfite.

12. A method according to claim 2, wherein the methanol concentration in the aqueous solution is 70 to 80 %.

13. A method according to claim 8, wherein the methanol concentration in the aqueous solution is 70 to 80 %.

* * * * *